(12) United States Patent
Oh

(10) Patent No.: US 10,377,455 B2
(45) Date of Patent: Aug. 13, 2019

(54) DRONE-TYPE LIFESAVING EQUIPMENT DROPPING DEVICE

(71) Applicant: SOOMVI CO., LTD., Incheon (KR)

(72) Inventor: In Seon Oh, Incheon (KR)

(73) Assignee: SOOMVI CO., LTD., Incheon (KR)

( * ) Notice: Subject to any disclaimer, the term of this patent is extended or adjusted under 35 U.S.C. 154(b) by 168 days.

(21) Appl. No.: 15/324,161

(22) PCT Filed: Dec. 4, 2015

(86) PCT No.: PCT/KR2015/013217
§ 371 (c)(1),
(2) Date: Jan. 5, 2017

(87) PCT Pub. No.: WO2016/159481
PCT Pub. Date: Oct. 6, 2016

(65) Prior Publication Data
US 2017/0210451 A1    Jul. 27, 2017

(30) Foreign Application Priority Data

Apr. 1, 2015  (KR) .......................... 10-2015-0046385

(51) Int. Cl.
*B63C 9/01* (2006.01)
*B63C 9/22* (2006.01)
(Continued)

(52) U.S. Cl.
CPC ................. *B63C 9/01* (2013.01); *B63C 9/08* (2013.01); *B63C 9/22* (2013.01); *B64C 39/024* (2013.01);
(Continued)

(58) Field of Classification Search
CPC .... B63C 9/01; B63C 9/08; B63C 9/22; B64C 39/024; B64C 2201/027; B64C 2201/024; B64C 2201/108; B64C 2201/128; B64C 2201/127; B64D 1/12; B64D 1/10; B64D 1/02
(Continued)

(56) References Cited

U.S. PATENT DOCUMENTS

| 4,138,077 | A | * | 2/1979 | Okumura | ................. | A62B 1/00 |
| | | | | | | 244/137.2 |
| 5,125,601 | A | * | 6/1992 | Monford, Jr. | .......... | B64G 1/641 |
| | | | | | | 244/173.1 |

(Continued)

FOREIGN PATENT DOCUMENTS

| JP | 2002037817 | 2/2002 |
| KR | 101373038 | 3/2014 |

(Continued)

*Primary Examiner* — Muhammad Shafi
(74) *Attorney, Agent, or Firm* — IPLA P.A.; James E. Bame

(57) ABSTRACT

A drone-type lifesaving equipment dropping device including: an unmanned aerial vehicle (2) having a propeller (4) and a rotor (3) configured to rotate the propeller; a holding member (10) which is installed to the unmanned aerial vehicle (2) and configured to be operated by wireless control; and a lifesaving equipment which is detachably engaged to the holding member (10) and is dropped from the holding member (10) after the lifesaving equipment is disengaged from the holding member.

3 Claims, 6 Drawing Sheets

(51) Int. Cl.
*B64D 1/02* (2006.01)
*B63C 9/08* (2006.01)
*B64C 39/02* (2006.01)
*B64D 1/10* (2006.01)
*B64D 1/12* (2006.01)

(52) U.S. Cl.
CPC ............... *B64D 1/02* (2013.01); *B64D 1/10* (2013.01); *B64D 1/12* (2013.01); *B64C 2201/024* (2013.01); *B64C 2201/027* (2013.01); *B64C 2201/108* (2013.01); *B64C 2201/127* (2013.01); *B64C 2201/128* (2013.01)

(58) Field of Classification Search
USPC .............................................................. 701/2
See application file for complete search history.

(56) References Cited

U.S. PATENT DOCUMENTS

| | | | |
|---|---|---|---|
| 8,998,666 B1* | 4/2015 | Albright | ............... B63C 9/00 340/539.13 |
| 9,280,038 B1* | 3/2016 | Pan | ............... G03B 17/561 |
| 2014/0170914 A1* | 6/2014 | Kinoshita | ............... B63C 9/01 441/83 |
| 2015/0158587 A1* | 6/2015 | Patrick | ............... B64C 39/024 244/137.4 |

FOREIGN PATENT DOCUMENTS

| | | | |
|---|---|---|---|
| KR | 2004-74119 | * | 9/2014 |
| KR | 101437323 | | 9/2014 |
| KR | 200474119 | | 9/2014 |

* cited by examiner

DRONE-TYPE LIFESAVING EQUIPMENT DROPPING DEVICE

BACKGROUND

The present invention relates to a drone-type lifesaving equipment dropping device, and more particularly, to a drone-type lifesaving equipment dropping device of a new configuration which can quickly approach a drowning sufferer by use of an unmanned aerial vehicle which can be operated by remote control, thereby dropping a lifebuoy or other lifesaving equipment for the sufferer.

In the case where a person falls into water, for example, due to sinking of a ship in a sea or river, or tidal waves or offshore currents near a shore, quick rescue operations are necessary to rescue the person from drowning. If the rescue operations are delayed, it is not possible to save a life. Actually, if a person falls into water, a prime time to save the life is just a few minutes. Accordingly, after a rescue worker sees a drowning person, a process of driving a boat to approach the person and dispensing a lifesaving equipment usually exceeds the prime time, resulting in a failure of rescuing one from drowning.

SUMMARY OF THE INVENTION

Accordingly, the present invention has been made in view of the above-mentioned problems occurring at disaster accident, and an object of the present invention is to provide a drone-type lifesaving equipment dropping device of a new configuration which can quickly transport a lifebuoy or other lifesaving equipment for a person who falls into water due to sinking of a ship in a sea or river or tidal waves or offshore currents near a shore, and can drop the lifebuoy for the sufferer.

To accomplish the above-mentioned object, according to one aspect of the present invention, there is provided a drone-type lifesaving equipment dropping device including: an unmanned aerial vehicle having a propeller and a rotor configured to rotate the propeller; a holding member which is installed to the unmanned aerial vehicle and configured to be operated by wireless control; and a lifesaving equipment which is detachably engaged to the holding member and is dropped from the holding member after the lifesaving equipment is disengaged from the holding member.

According to one feature of the present invention, the lifesaving equipment is a lifebuoy, the holding member is switched between a first state in which the holding member holds or supports the lifebuoy and a second state in which the holding member releases the lifebuoy or is retracted from a position to support the lifebuoy, and the unmanned aerial vehicle is provided with a camera which is operated by remote control and wirelessly sends a video.

According to another feature of the present invention, the holding member includes at least one horizontal frame, a plurality of support arms arranged on the horizontal frame so that the support arms are expanded or retracted in a diametric direction, a motor disposed at a center of the horizontal frame, and a link member configured to connect the motor and each proximal end of the support arms and transfer rotating movement of the motor to expanding or retracting movement of the support arms, and the holding member supports the lifebuoy in the first state by expanding the support arms so that the support arms are inserted into slots formed on an inner peripheral surface of the lifebuoy, are brought into close contact with the inner peripheral surface of the lifebuoy, or expand to a bottom of the lifebuoy, while the support arms are retracted in the second state, so that the lifebuoy is separated from the holding member.

According to the other aspect of the present invention, there is provided a rescuing method using a drone-type lifesaving equipment dropping device, the rescuing method including: receiving information about occurrence of distress accident and a position of the accident in a sea, a river or a lake through surveillance of a guardian, accident information obtained from a third party, or a monitoring apparatus; approaching an unmanned aerial vehicle having a lifesaving equipment holding member which can be operated by remote control and a camera for taking a video and wireless sending a video, to a scene of the accident in an unmanned flight manner or an autonomous navigation manner; and figuring out an appropriate drop zone of the lifesaving equipment by the guardian at a remote place while the guardian is watching the video sent from the camera which is taken from the scene of the accident, to dispatch the unmanned aerial vehicle to the drop zone, and dropping the lifesaving equipment by operating the holding member by remote control.

According to the present invention, the unmanned aerial vehicle is equipped with the lifesaving equipment, for example, the lifebuoy, by the holding member, and approaches the scene of a distress accident in the unmanned flight manner or the autonomous navigation manner. And then, the lifesaving equipment is dropped from the holding member by the remote control. Therefore, in the case where a rescue boat is hard to approach to the scene of accident, such as sinking of a ship in a sea, or the lifesaving equipment is hard to be sent to the scene of accident, it is possible to quickly and accurately approach to the spot of the accident along the most direct route through the unmanned flight, and to drop the lifesaving equipment for the sufferer. The possibility of saving a life within a prime time can be maximized.

Also, according to the present invention, the lifesaving equipment is a lifebelt, that is, the lifebuoy. The holding member is switched between the first state in which the holding member holds or supports the lifebuoy and the second state in which the holding member releases the lifebuoy or is retracted from the position to support the lifebuoy. In addition, the unmanned aerial vehicle is provided with the camera which is operated by remote control and wirelessly sends the video in real time. When a guardian working at a guard post or a control center finds a person who falls into water, the guardian can dispatch the unmanned aerial vehicle to the spot of the accident by the remote control or the autonomous navigation, and then drop the lifebuoy for the sufferer, thereby providing the sufferer with the lifebuoy in the least amount of time and thus saving the life within the prime time. In this instance, since the camera 8 mounted to the unmanned aerial vehicle to take the video of the spot of the accident and the surroundings in real time and wirelessly sends the video, the guardian can approach the unmanned aerial vehicle to the scene of the accident while visually figuring out the correct position of the accident, and can drop the lifebuoy, thereby quickly and correctly approaching the scene of the disaster and thus saving the life within the prime time.

In addition, the holding member includes at least one horizontal frame, the plurality of support arms arranged on the horizontal frame so that the support arms are expanded or retracted in the diametric direction, the motor disposed at the center of the horizontal frame, and the link member configured to connect the motor and each proximal end of the support arms. With the simple configuration, distal ends of the support arms are expanded and are inserted into the slots formed on the inner peripheral surface of the lifebuoy, are brought into close contact with the inner peripheral surface of the lifebuoy, or expand to the bottom of the lifebuoy. If the support arms are retracted, the lifebuoy is separated from the holding member, and then is dropped, thereby surely performing the engaging and disengaging operation of the lifebuoy.

DETAILED DESCRIPTION OF THE INVENTION

Figure 1:
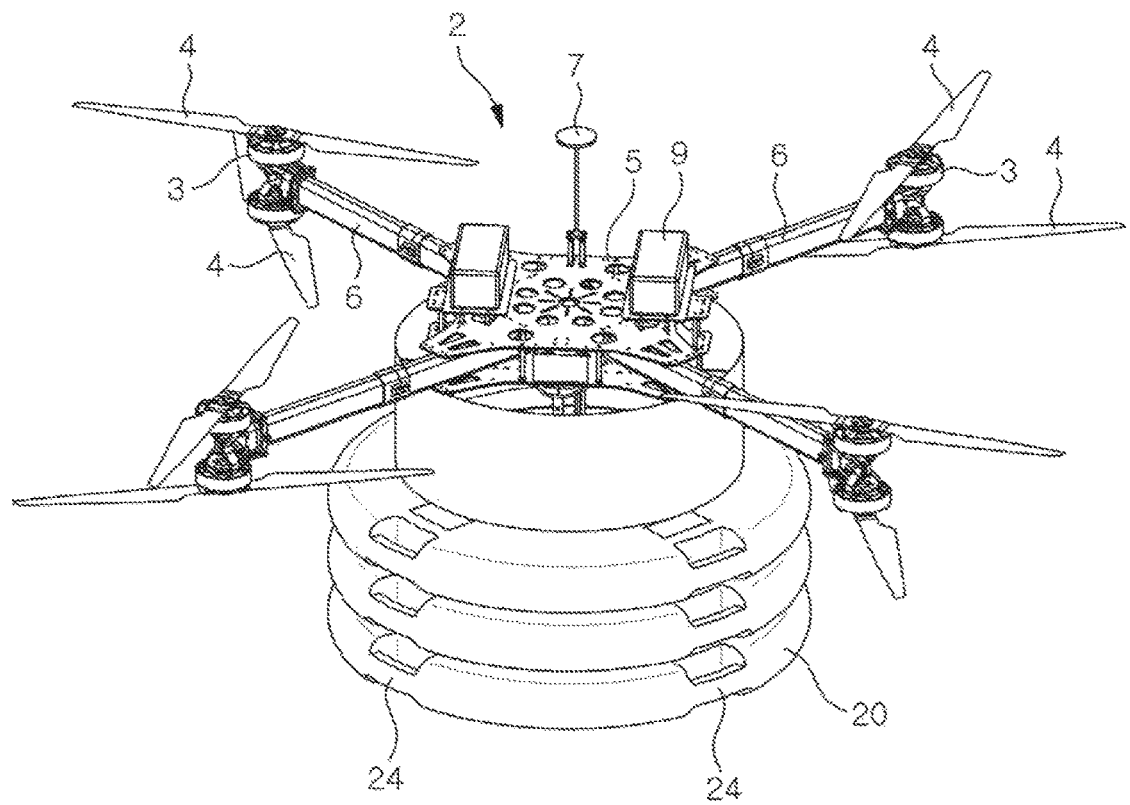
FIG. 1 is a perspective view of an embodiment of the present invention.

A preferred embodiment of the present invention will now be described. FIGS. 1 to 4 are views of a lifesaving equipment dropping device according to the preferred embodiment of the present invention. As illustrated in the figures, the present invention provides an unmanned aerial vehicle 2 having four propellers 4 and four rotors for rotating each propeller 4 and configured to perform unmanned flight or autonomous navigation. Such an unmanned aerial vehicle is referred to as a drone. The unmanned aerial vehicle 2 has a main body 5 and extension arms 6 diametrically expanding from the main body 5, and the rotor 3 and the propellers 4 are installed to each distal end of the extension arms 6. The main body 5 of the unmanned aerial vehicle 2 is provided on a top surface thereof with a GPS antenna 7 for receiving or transmitting GPS information on the unmanned aerial vehicle 2, a battery 9 and a wireless transmitter (not shown) for receiving or transmitting the information from or to a main controller of a guardian or a control center, or a remote controller.

Figure 5:
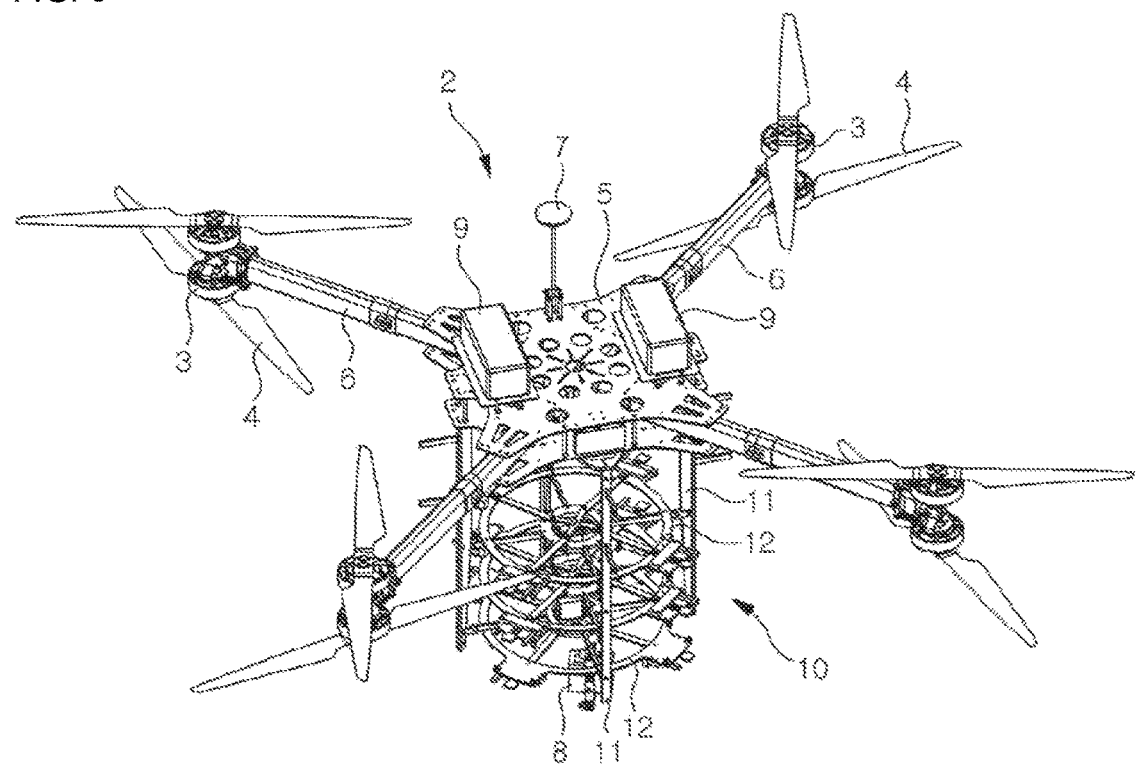
FIG. 5 is a perspective view of the embodiment from which a lifebuoy is detached.
Figure 6:
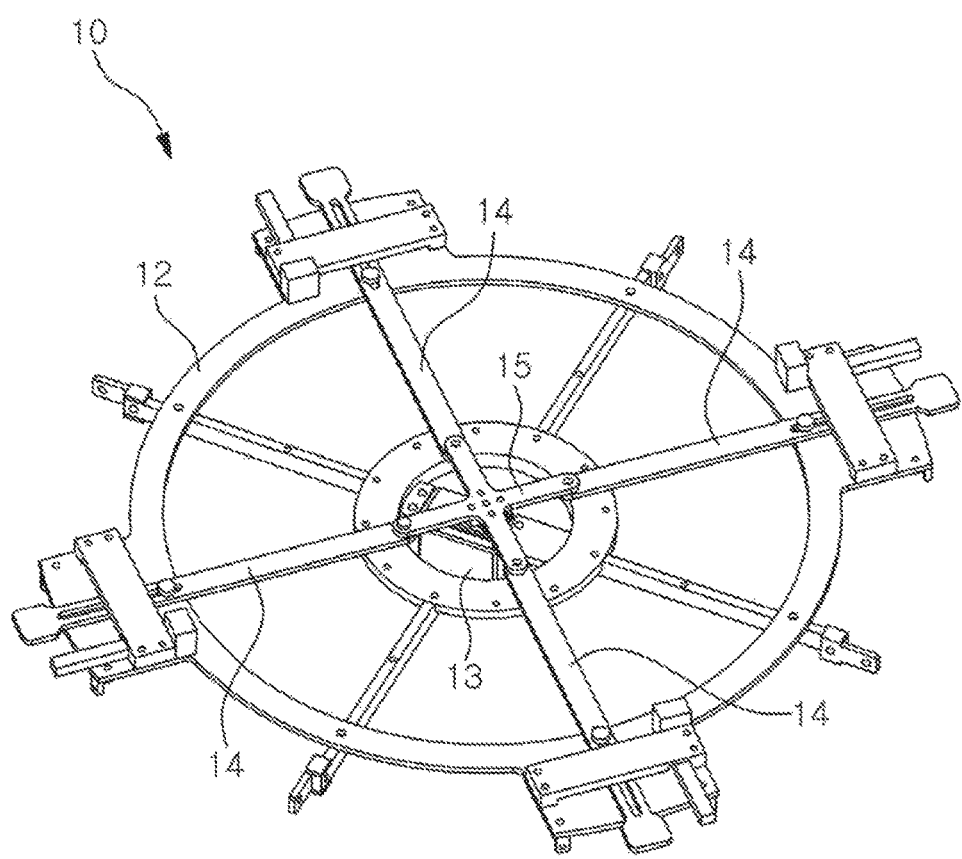
FIGS. 6 and 7 are views illustrating engaging and disengaging states of a holding member according to the embodiment.
Figure 7:
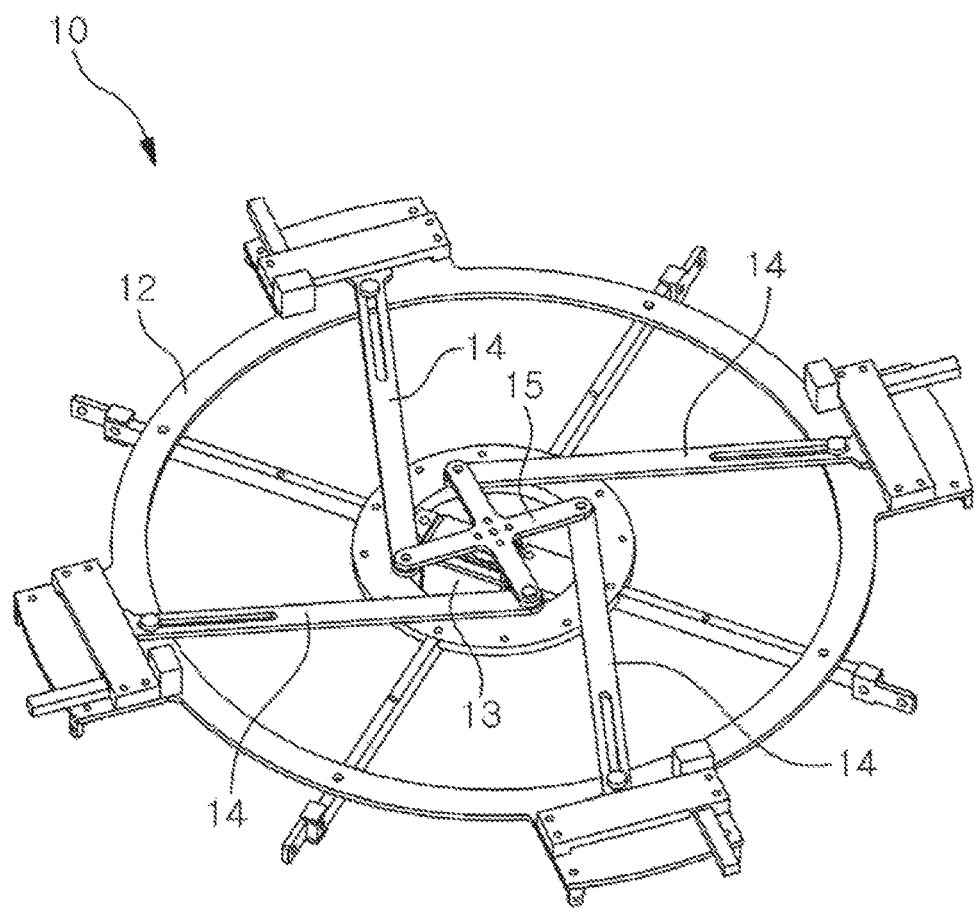
Figure 8:
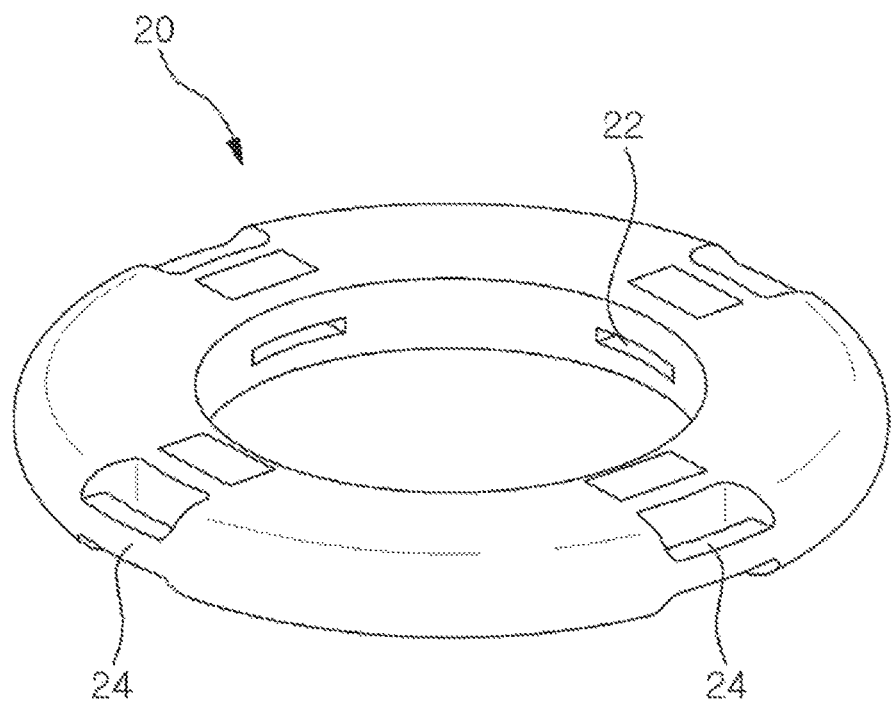
FIG. 8 is a perspective view of a lifebuoy according to the embodiment.

A lower portion of the main body 5 is provided with a holding member 10 for holding a lifesaving equipment, i.e., a lifebuoy 20. The holding member 10 is configured to be mounted to the unmanned aerial vehicle 2 so that the holding member is engaged to the lifebuoy 20 and is disengaged from the latter by the wireless control of the guardian to drop the lifebuoy 20, after it arrives at the scene of an accident. The holding member 10 has vertical frames 11 vertically expanding along a circumference thereof at regular intervals, and a plurality of ring-shaped horizontal frames 12 vertically spaced and mounted to the vertical frames 11, as illustrated in FIGS. 5 to 7. The horizontal frame 12 has a motor 13 disposed at a center of the horizontal frame 12, and a plurality of support arms 14, which can be expanded outwardly or retracted inwardly, arranged along the circumference of the horizontal frame 12. A rotating shaft of the motor 13 is linked to each proximal end of the support arms 14 through a cross-shaped link member 15. Accordingly, the support arms 14 can be expanded or retracted by forward rotation or backward rotation of the motor 13. That is, in the case where the support arms 14 are expanded, as illustrated in FIG. 6, a center axis of the support arm diametrically expands to pass the center of the horizontal frame 12, but, in the case where the support arms 14 are retracted, as illustrated in FIG. 7, the support arms 14 move obliquely and the center axis of the support arm do not pass the center of the horizontal frame 12. As illustrated in FIG. 8, the lifebuoy 20 according to the embodiment is a standard one which has slots 22 formed on an inner peripheral surface thereof, and handles 24 formed on an outer peripheral surface.

Figure 2:
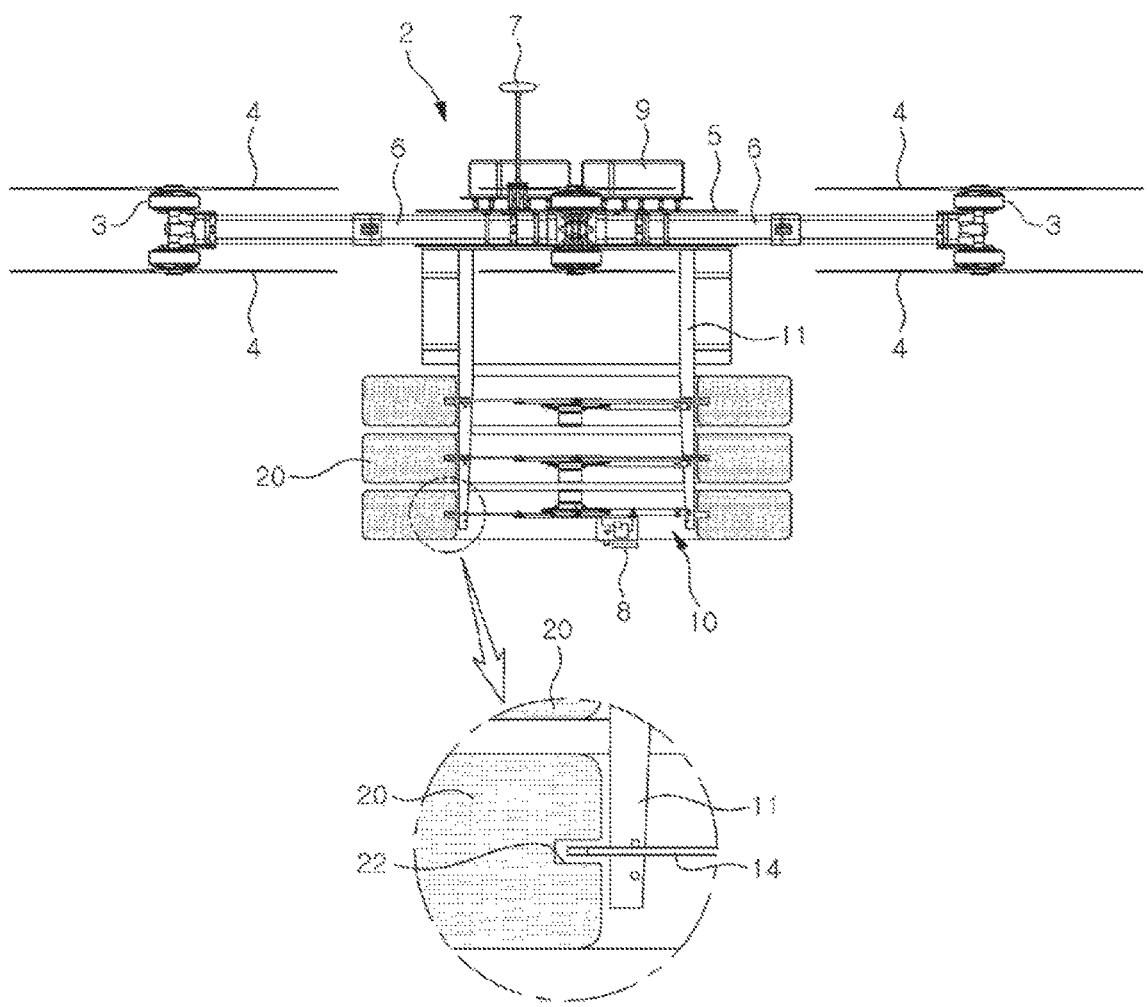
FIG. 2 is a cross-sectional view of the embodiment.
Figure 3:
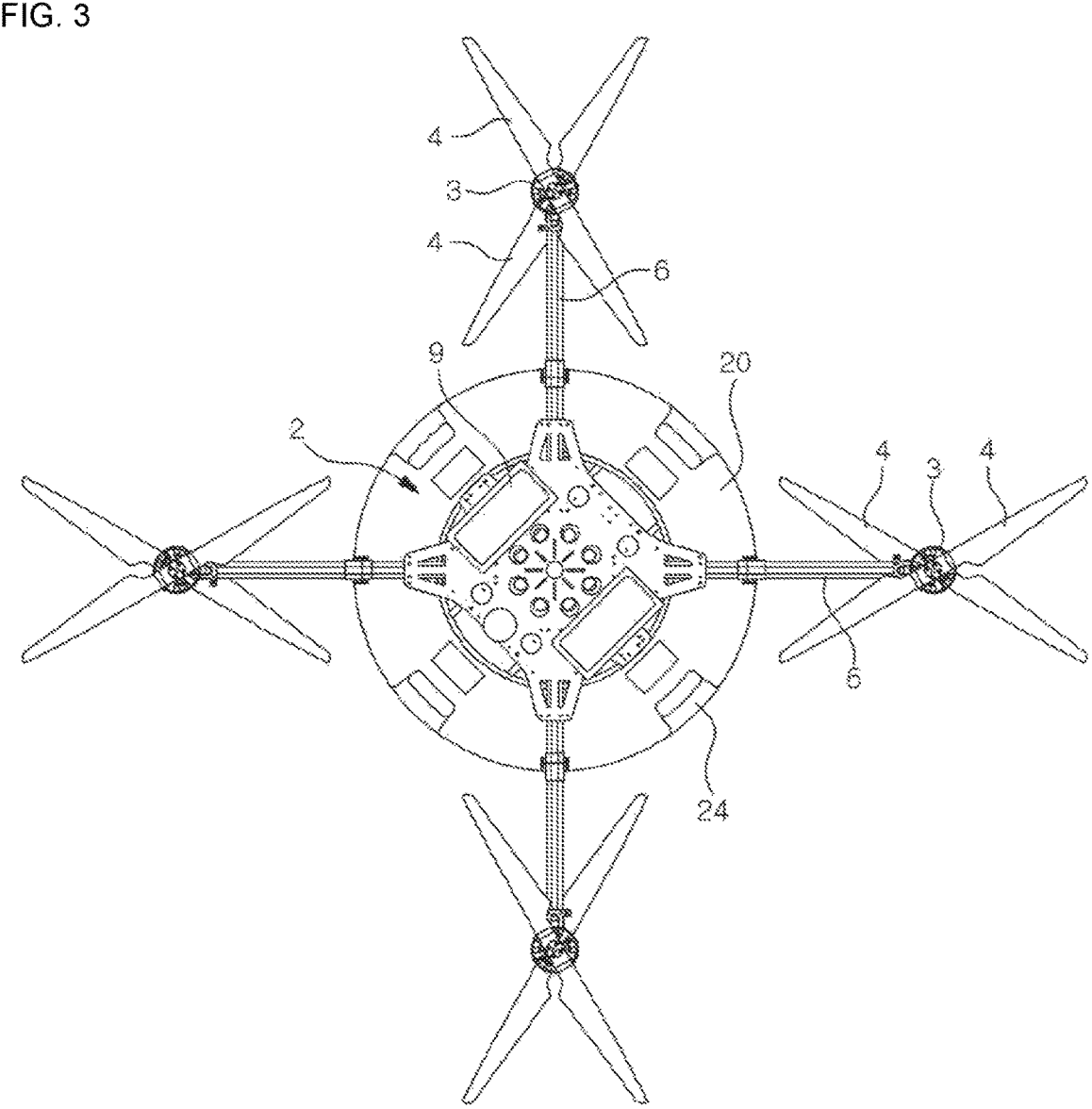
FIG. 3 is a plan view of the embodiment.
Figure 4:
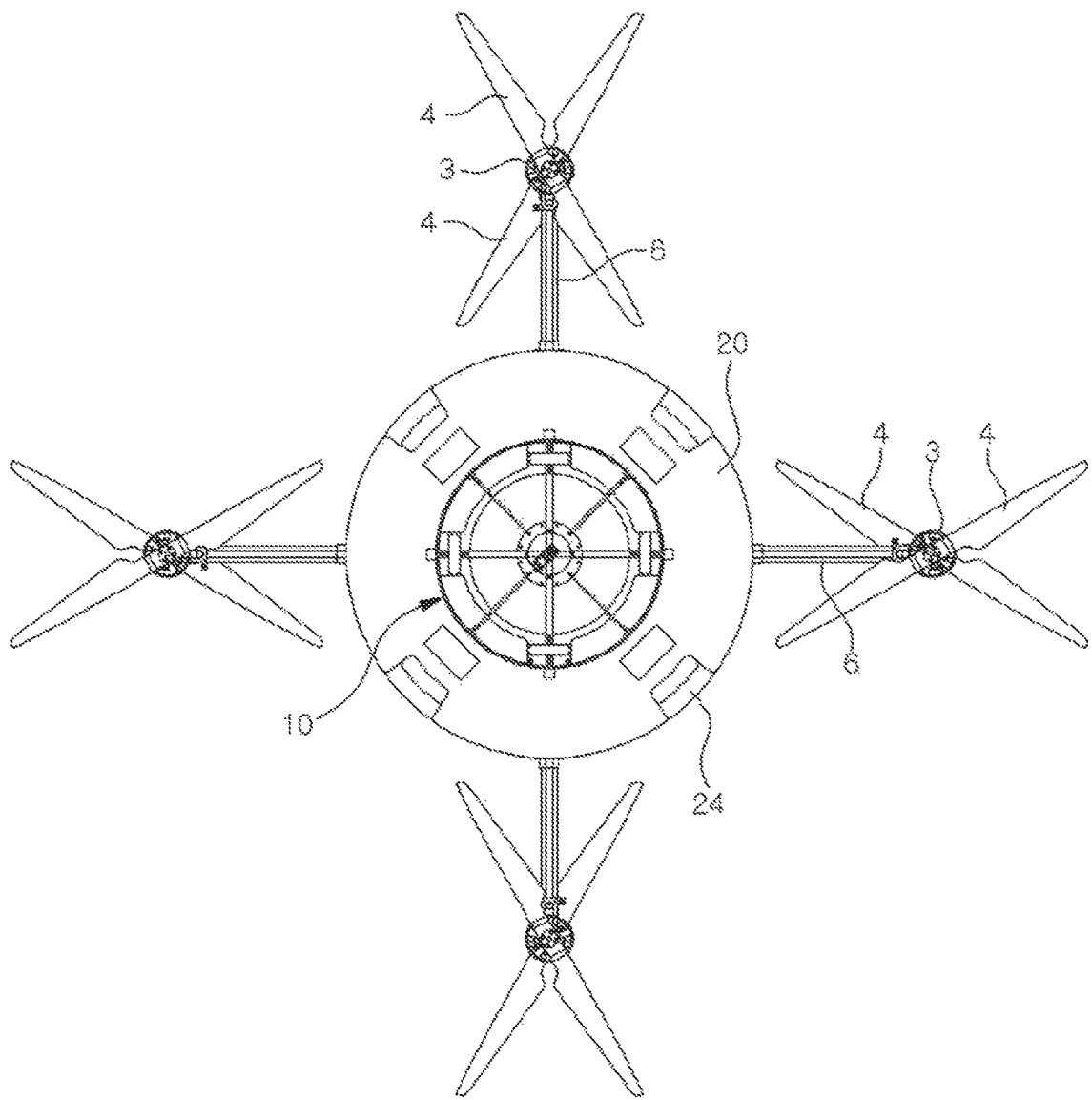
FIG. 4 is a bottom view of the embodiment.

The engaging and disengaging operation of the holding member 10 having the configuration described above will now be described. First, in the first state in which the support arms 14 are expanded, as illustrated in FIG. 2, each distal end of the support arms 14 is inserted into the slot 22 formed on the inner peripheral surface of the lifebuoy 20, and thus the lifebuoy 20 is engaged with the support arms 14. In the second state in which the support arms 14 are retracted, each distal end of the support arms 14 is moved out from the slot 22 of the lifebuoy 20, and thus the lifebuoy 20 is disengaged from the support arms 14, so that the lifebuoy 20 is dropped from the holding member due to the weight of the lifebuoy. Although the embodiment illustrates that the support arms 14 are inserted into the slots 22 formed on the inner peripheral surface of the lifebuoy 20, each distal end of the support arms 14 may be brought into close contact with the lifebuoy 20 to support the latter, or may expand to the bottom of the lifebuoy 20 to support the latter.

In the shown embodiment, three lifebuoys 20 are stacked in a vertical direction, so that the lowermost lifebuoy 20 can be first dropped at the scene of a rescue, and other lifebuoys 20 can be dropped in order if necessary. Therefore, in the case of many sufferers, the present invention can drop the lifebuoy 20 for each sufferer. Also, even in the case of single sufferer, if the sufferer cannot easily approach the dropped lifebuoy 20, the present invention can again drop other lifebuoy 20 at a proper location where the sufferer can easily approach. The number of the lifebuoys 20 can be appropriately selected in view of the performance of the unmanned aerial vehicle 2 or the conditions of the distress accident.

The holding member 10 may be provided on the lower portion thereof with a camera 8 which is operated by remote control, so that the guardian can move the unmanned aerial vehicle quickly and accurately to the scene of the accident by a portable controller while visually searching a flying direction of the unmanned aerial vehicle or the location of the accident through the video sent from the camera 8 at real time, thereby performing the rescue operations, i.e., controlling the accurate movement of the unmanned aerial vehicle and the appropriate dropping of the lifebuoy 20. Also, the unmanned aerial vehicle according to the present invention may be provided with a loudspeaker and a microphone, so that the guidance or rescuer can send necessary instruction to the sufferer, and take conversation with the sufferer to perform efficient rescue operations.

In the case of establishing a sea rescue system using the drone-type lifesaving equipment dropping device according to the present invention, a disaster monitoring center constructed at a beach or the like may be provided with a remote control controller for the unmanned aerial vehicle 2, a video receiving device for displaying a video sent from the camera 8, and the like. Also, the disaster monitoring center may be provided with a drone with no lifesaving equipment for the purpose of surveillance, thereby monitoring occurrence of the disaster or accident in advance by making the unmanned flight in a surveillance area or a danger area.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The present invention is mostly suitable to the water accident, but can be applied to various disasters, such as building fire, mountain accident, avalanche, earthquake, or the like, by appropriately modifying the lifesaving equipment.

The invention claimed is:

1. A drone-type lifesaving equipment dropping device comprising:
   an unmanned aerial vehicle having a propeller and a rotor configured to rotate the propeller;
   a holding member which is installed to the unmanned aerial vehicle and configured to be operated by wireless control; and
   a lifesaving equipment which is detachably engaged to the holding member and is dropped from the holding member after the lifesaving equipment is disengaged from the holding member,
   wherein the holding member includes at least one horizontal frame, a plurality of support arms arranged on the horizontal frame so that the support arms are expanded or retracted in diametric direction,
   a motor disposed at a center of the horizontal frame, and
   a link member configured to connect the motor and each proximal end of the support arms and transfer rotating movement of the motor to expanding or retracting movement of the support arms, and
   the holding member supports the lifebuoy in the first state by expanding the support arms so that the support arms are inserted into slots formed on an inner peripheral surface of the lifebuoy, are brought into close contact with the inner peripheral surface of the lifebuoy, or expand to a bottom of the lifebuoy, while the support arms are retracted in the second state, so that the lifebuoy is separated from the holding member.

2. The drone-type lifesaving equipment dropping device according to claim 1, wherein the lifesaving equipment is a lifebuoy, the holding member is switched between a first state in which the holding member holds or supports the lifebuoy and a second state in which the holding member releases the lifebuoy or is retracted from a position to support the lifebuoy, and the unmanned aerial vehicle is provided with a camera which is operated by remote control and wirelessly sends a video.

3. The drone-type lifesaving equipment dropping device according to claim 2, wherein the holding member includes at least one horizontal frame, a plurality of support arms arranged on the horizontal frame so that the support arms are expanded or retracted in a diametric direction, a motor disposed at a center of the horizontal frame, and a link member configured to connect the motor and each proximal end of the support arms and transfer rotating movement of the motor to expanding or retracing movement of the support arms, and the holding member supports the lifebuoy in the first state by expanding the support arms so that the support arms are inserted into slots formed on an inner peripheral surface of the lifebuoy, are brought into close contact with the inner peripheral surface of the lifebuoy, or expand to a bottom of the lifebuoy, while the support arms are retracted in the second state, so that the lifebuoy is separated from the holding member.

* * * * *